United States Patent Office 3,499,773
Patented Mar. 10, 1970

3,499,773
SEMICRYSTALLINE CERAMIC BODIES,
AND METHOD
Richard W. Petticrew, Perrysburg, and George A. Simmons, Toledo, Ohio, assignors to Owens-Illinois, Inc., a corporation of Ohio
No Drawing. Filed July 22, 1966, Ser. No. 567,076
Int. Cl. C03b *31/00;* C03c *3/22, 23/00*
U.S. Cl. 106—39                          13 Claims

ABSTRACT OF THE DISCLOSURE

A semicrystalline glass-ceramic article having transparent and opaque areas arranged in a manner such that they impart a decorative effect to the article or form letters, numbers, gradations, and the like, on the article. The article is formed from a thermally crystallizable lithium-alumino-silicate glass and is then subjected to a heat treatment sufficient to convert the glass to a transparent semicrystalline glass-ceramic. Selected portions of the glass-ceramic are then subjected to further heat treatment to convert those portions to an opaque glass-ceramic while the remainder of the glass-ceramic remains transparent.

---

The present invention relates to the production of semicrystalline ceramic materials by the controlled crystallization of glass. More particularly, this invention relates to methods of producing transparent, low expansion, semicrystalline glass ceramic articles having selected opaque areas.

Low expansion, semicrystalline ceramic materials have many applications where thermal shock resistance and high temperature stability are required. Typical applications include cooking ware such as coffee pots, frying pans and baking dishes, and scientific ware such as beakers and flasks.

In the above and other applications involving transparent, semicrystalline ceramics, it is often required or desired that the semcrystalline bodies have external markings. The markings may be in the form of aesthetic decorations or may be functional markings such as volumetric graduations and the like. Difficulties often arise with respect to the decoration of these low expansion ceramics in that the overall strength of the body may be decreased. This weakness is primarily manifested in the poor resistance to thermal shock of the decorated semicrystalline article. The reason for this weakening effect is not well understood, but it is suspected to be due to irregular stress patterns established as a result of the thermal expansion differential between the low expansion ceramic and the decorating material. Another possibility is that the process of decoration causes the formation of surface defects, which in turn act as centers of stress concentration. Whatever the cause, this weakening effect is a definite problem with respect to the production of low expansion, semicrystalline ceramic materials wherein the major crystalline phases comprise lithium alumino-silicates.

It is, therefore, an important object of the present invention to eliminate the need for the application of a foreign material in a method of decorating certain transparent, semicrystalline ceramic materials made by crystallization of glass.

Another object of the present invention is to provide a method of producing low expansion, transparent, crystallized glass-ceramics having opaque portions or areas for decorative, informational, and other purposes.

Another object of the present invention is to provide a method of selectively forming opaque portions or areas in certain transparent, semicrystalline lithium aluminosilicate articles.

Still another objection of the present invention is to provide a method of producing a body that is semicrystalline throughout and having preselected transparent and opaque portions.

Still another object of the present invention is to provide low expansion, semicrystalline ceramics having transparent and opaque areas and exhibiting surprising resistance to thermal shock.

The above and other objects, features and advantages of the present invention will become apparent to those skilled in the art upon reading the detailed description contained herein.

According to the present invention, the foregoing objects are obtained by a multi-step heat treatment of crystallizable lithium-alumino-silicate glasses to form articles containing both transparent and opaque portions.

Thus, according to the present invention, there is provided a process which comprises heat treating a lithium-alumino-silicate shaped glass body or article to form a transparent semicrystalline ceramic (i.e., a glass-ceramic which is essentially transparent and has an average lineal coefficient of expansion of less than $20 \times 10^{-7}/°$ C., over the range 0–300° C.), and heat treating selected portions of said transparent glass-ceramic under more severe time-temperature conditions to form opaque areas in said heat treated portions.

The glass-ceramic articles of the present invention are not mere opacified glass bodies; they are relatively highly crystalline in both the opaque and the transparent portions, in contrast to glass bodies having small proportions of the order of 5 to 15 volume percent of crystalline material rendering the glass bodies opaque. The present starting material glass bodies are those which are thermally crystallizable to glass-ceramics which contain as the predominant crystalline species, lithium-containing crystalline phases of a nature to be described hereinafter. By predominant crystalline species, it is meant that the lithium-containing crystalline phases are present in larger volume percent than any other crystalline material present in the claimed ceramic product. Glass-ceramic bodies of the invention are relatively highly crystallized, as indicated by the change in the lineal coefficient of thermal expansion over the range 0–300° C., as compared to the starting material glass. Thus, the glass-ceramics or semcrystalline materials of the present invention are, in both their opaque and in their transparent portions, crystallized to such a degree that their average lineal coefficient of thermal expansion over the range 0–300° C., is no more than 60 percent of the average lineal coefficient of thermal expansion of the starting material glass.

Many such crystallizable glasses are known and such compositions are not per se a part of the present invention. For instance, a large number of such glasses are disclosed in copending application Ser. No. 464,147, filed June 15, 1965, copending application Ser. No. 522,020, filed Jan. 21, 1966, and now abandoned and published Dutch patent application 6509945, all assigned to the assignee of the present invention.

It is not definitely known why this additional heat treatment causes the transparent semicrystalline body to become opaque in the heated portions, but one possible explanation is based on the following theory. The transparency of such semicrystalline products is believed to be caused by either the close similarity between the refractive indices of the crystals and the glassy matrix, or to the size of the crystals being too small to scatter visible light. When the additional non-uniform heat treatment is utilized, the crystals are caused to preferentially grow to the point where they interfere with the passage of light, or possibly the index of refraction of the crystalline phase is somehow changed by the additional heat treatment.

Whatever the cause, we have been able to achieve this effect without establishing detrimental internal stress gradients as will be seen in the following examples.

In carrying out the present invention, we have found it especially desirable to select a crystallizable glass from the system $Li_2O$—$Al_2O_3$—$SiO_2$ within the following range of composition:

| Component | Broad range, percent by weight | Preferred range, percent by weight |
|---|---|---|
| $SiO_2$ | 50-75 | 55-72 |
| $Al_2O_3$ | 16-35 | 16-27 |
| $Li_2O$ | 2.5-6 | 3-5 |

In addition to the above, the glass composition usually contains at least one nucleating agent to facilitate the inception of crystalline growth centers. Many effective nucleating agents and combinations of nucleating agents are well known, and the choice of such nucleating agents are not per se part of the present invention. However, especially suitable nucleating agents have been found to be $TiO_2$, $ZrO_2$ and combinations thereof.

In general, nucleating agents are materials which have the effect in the glass, when properly heat treated, of causing the formation of larger numbers of homogeneously dispersed crystals in the glass than in their absence. It appears probable that the glasses used in the present invention first form a microscopic or submicroscopic dispersed glass phase, and that this dispersed phase somehow initiates the formation of the predominant crystalline species, in some manner enabling this predominant crystalline species to crystallize substantially homogeneously throughout the mass of glass being heat treated, and helping to limit the maximum size of the crystals by providing many sites for crystal initiation.

Some useful nucleating agents in typical percentage by weight are shown below:

Nucleant: Range, percent
- $TiO_2$ _____ 0-6
- $ZrO_2$ _____ 0-12
- $SnO_2$ _____ 0-12
- ($TiO_2$+$ZrO_2$+$SnO_2$) _____ 1.5-12

It is often desirable to include various modifying agents to aid in refining, control viscosity, influence chemical durability, etc. Such modifying agents can be included in the composition, provided they do not inhibit the in situ formation of lithium-containing crystalline phases either as beta-eucryptite or beta-eucryptite like crystals or as beta-spodumene or beta-spodumene like crystals or both as indicated by X-ray diffraction data.

Modifying agents from the following list are often used in the ranges shown:

Modifying agent: Range, weight percent
- $K_2O$, $Na_2O$—($R_2O$) _____ 0-2
- CaO, MgO, BaO—(RO) _____ 0-5
- $P_2O_5$ _____ 0-3
- ZnO _____ 0-5
- $F_2$ _____ 0-0.2

In addition to the above modifying agents, fining agents such as $As_2O_3$ and $Sb_2O_3$ are usually included in minor amounts.

In an important embodiment of the present invention, a thermally crystallizable glass composition within the system $Li_2O$—$Al_2O_3$—$SiO_2$ containing at least one nucleating agent such as $TiO_2$, $ZrO_2$ and the like is formed and thermally in situ crystallized throughout to form a glass-ceramic, having preselected transparent and opaque areas, wherein the glass-ceramic contains as the predominant crystalline species, lithium-containing crystalline phases either as beta-spodumene or beta-spodumene like crystals, or as beta-eucryptite or beta-eucryptite like crystals, or both, as indicated by X-ray diffraction data.

In this specification, the terms beta-eucryptite crystals and beta-eucryptite like crystals have been used in an alternative sense. Thus, while beta-eucryptite is often thought of as the species crystal having one mole of lithia, one mole of alumina and 2 moles of silica, both terms are used in this application to designate crystalline species having the beta-eucryptite structure, as shown by X-ray diffraction, but the peaks can be shifted slightly depending upon whether there is a definite amount of silica present other than exactly 2 moles, either more or less silica than the 2 moles. Similarly, the terms beta-spodumene crystals and beta-spodumene like crystals are used alternatively and in a generic sense, specifying crystalline species that have the crystalline structure of beta-spodumene that contains 4 moles of silica to one of alumina and one of lithia, but with the peaks shifted somewhat when the crystalline structure contains more or less than 4 moles of silica. In the claims, therefore, the terms beta-eucryptite and beta-spodumene are each used in this generic sense.

In one embodiment of the present invention, one first selects and melts a suitable lithium aluminosilicate glass composition containing sufficient nucleant to produce a transparent, low expansion glass-ceramic on in situ thermal crystallization. The glass is formed into any desired shape and then heat treated for nucleation and crystallization to obtain the transparent ceramic. The optimum heat treatment depends, as will be understood, on the particular glass composition, the ratio of ingredients and the type and amount of its nucleants, as well as the final proportion desired. Therefore, it is not possible to specify a heat treatment schedule that will be common to all embodiments of the present invention. However, it is usually preferred that the first heat treatment step be in the temperature region of maximum or high rate of nuclei or crystallite formation, wherein "nuclei" are defined as submicroscopic precursors of crystalline species or as a finely dispersed submicroscopic immiscible glassy phase. It is difficult to measure directly the area or range of temperatures in which the maximum rates of nuclei formation occurs, or in other words where the optimum temperatures for the initial heat treatment is to be located. However, this temperature usually lies in the range of from 30° F., below the annealing point of the glass to 250° or 300° F., above the annealing point of the glass.

Annealing point temperature can be determined by ASTM Designation C 336–54T, with the testing apparatus being calibrated using fibers of standard glasses having known annealing and strain points as specified and published by the National Bureau of Standards.

In most instances to make a transparent glass-ceramic the parent glass is heated within the foregoing initial temperature range for a time of at least 15 minutes, usually at least one hour, after which it is heated at the same or at a higher temperature to complete crystallization to the desired degree, at least until the average lineal coefficient of thermal expansion is no more than 60 percent of the expansion of the starting material glass and is in any event no more than $12 \times 10^{-7}/°$ C. (0–300° C.). The maximum temperature for this last treatment step is usually not more than 350° F., above the annealing point temperature, although higher temperatures can be employed so long as the glass-ceramic remains transparent, with substantially all of the crystals therein having a diameter less than ⅓ micron. Times vary from substantially zero at the maximum temperature employed (simply heating to a higher temperature and then cooling) to many hours or even days. It will be understood that, for a given degree of crystallization times vary generally inversely with temperature.

While a second, higher temperature is often employed after the initial nucleating heat treatment step, it is usually possible to complete the crystallization to form the transparent, low expansion, glass-ceramic by effecting the entire heat treatment at the same low temperature as the initial or nucleating heat treatment temperature, or even at a lower temperature so long as this is not more than about 30° F., below the annealing point. Naturally, the heat treatment as such low temperatures will take longer time than if the temperature were raised for the final crystallization. Total heat treatment times in this embodiment can be as short as ½ hour or as long as many weeks. Such low temperature "isothermal" heat treatments tend to give a product having thick sections with more uniform coefficients of thermal expansion throughout the cross-section of the article. Also, such products tend to be more highly transparent and to have a smaller crystal size.

At this point in the heat treatment, the glass-ceramic body is uniformly crystalline, transparent and the predominant crystalline species are lithium containing crystalline phases and is primarily composed of fine crystals of beta-eucryptite or beta-eucryptite like crystalline forms as determined by X-ray diffractive analysis with perhaps some beta-spodumene or beta-spodumene like crystals also being present. The coefficient of thermal expansion is known to depend to a great extent on the degree of crystallinity and is usually between $-5$ and $+5\times10^{-7}/°$ C. although coefficients in the range of $-12$ to $+12\times10^{-7}/°$ C. are not uncommon. The areas to be selectively made opaque are subjected to additional heat treatment to effectuate additional crystalline growth. During this heat treatment it is suspected that substantial amounts of beta-spodumene or beta-spodumene like crystals are formed. In any event, the X-ray diffraction pattern of the opaque areas in the finished article, often indicate that both such crystalline forms are present. In the opaque portion, according to the present invention, the glass-ceramic has a lineal coefficient of expansion of no more than 60% of that of the starting material glass and is below $20\times10^{-7}/°$ C., over the range 0–300° C. Also, it should be noted that there is no sharp line of demarcation between the coefficient of expansion in the opaque zone and the transparent zones or portions; that is, there is in reality an intermediate zone gradually decreasing in coefficient of expansion from the fully opaque zone to the transparent zone. Thus, while it will be noted that the crystalline products of the invention are of somewhat higher expansion in their opaque than in their transparent zone, the process of this invention inherently given a "graded seal" or gradually changing coeffcient of expansion, thus greatly minimizing the danger that thermal shock will crack the article due to differences in expansion.

This secondary heat treatment is essentially nonuniform with respect to the article being treated and is conducted under more stringent time-temperature conditions, i.e., at higher temperatures or longer times, or both, than the above described primary heat treatment that effectuates the uniform crystallization to the transparent species. For instance, this secondary heat treatment of selected portions can be conducted in a range from about 300° F., above the annealing temperature of the glass to about 200° F., below the liquidus temperature of the original glass composition for periods ranging from a few minutes to several hours. Any source of heat can be used provided it can be non-uniformly applied to the body. More usually temperatures of about 600° F., above the annealing point to about 900° F., above the annealing point for periods of 15 minutes to 5 hours are employed in the interest of economic practicality.

During this secondary heat treatment selected portions of the transparent semicrystalline body are rendered opaque. The crystalline species is observed to change in that the X-ray diffraction data indicates that a substantial amount of beta-spodumene or beta-spodumene like crystalline species are now present. The coefficient of thermal expansion is also observed to have increased to about 5 to $15\times10^{-7}/°C.$ (0–300° C.).

The following examples set forth by way of illustration, the composition of a suitable glass and resulting in situ crystallized ceramics of invention having the properties of the ceramics of the invention set forth hereinbefore.

EXAMPLE I

The following batch materials were melted and homogenized with mechanical stirring under direct fire at a glass temperature of about 2800–2900° F., for several hours in a refractory furnace, using a slight excess of air in the melting flames.

| Batch materials: | Parts by wt. |
|---|---|
| Petalite [1] | 3904.2 |
| Ottawa flint [2] | 396.0 |
| Alumina [3] | 200.5 |
| Periclase [4] | 127.8 |
| Florida zircon [5] | 106.1 |
| Zinc oxide | 127.6 |
| Titanox [6] | 90.5 |
| Aluminum meta phosphate | 94.8 |
| Lithium fluoride | 13.7 |
| Sodium antimonate | 33.8 |

[1] 4.2% $Li_2O$, 16.2% $Al_2O_3$, 77.7% $SiO_2$, 0.4% $Na_2O$, 0.2% $K_2O$ and 0.027% $Fe_2O_3$ and other minor impurities, including 1% ignition loss.
[2] 99.9+% $SiO_2$.
[3] 99.5% $Al_2O_3$.
[4] Dead burned periclase supplied by Harbison Walker Refractories Co. from its Ludington Michigan plant under designation No. 98 as a source of MgO.
[5] 66% $ZrO_2$, 33.5% $SiO_2$, 0.25% $TiO_2$, 0.1% $Fe_2O_3$.
[6] Substantially pure $TiO_2$.

The above batch materials resulted in a glass of the following composition and properties:

| Constituent: | Percent by wt. |
|---|---|
| $SiO_2$ | 69.3 |
| $Al_2O_3$ | 17.0 |
| $Li_2O$ | 3.5 |
| $Na_2O$ | <0.5 |
| MgO | 2.5 |
| $ZrO_2$ | 1.4 |
| $TiO_2$ | 1.8 |
| $F_2$ | 0.1 |
| $P_2O_5$ | 1.5 |
| ZnO | 2.5 |
| $Sb_2O_3$ | 0.5 |

Liquidus—2430° F.
Annealing point—1200° F.
Log 4 viscosity—2400° F.
Coefficient of thermal expansion of glass (approximate), $45\times10^{-7}/°$ C. (0–300° C.)

Erlenmeyer flasks of about 200 ml. capacity were formed from the above glass composition by conventional blowing techniques. One of the flasks was then subjected to the following uniform heat treatments:

Heated to 1000° F., at 400° F./hr. and held at 1000° F., for 1 hour.
Heated from 1000° F., to 1275° F., at about 200° F./hour.
Heated from 1275° F., to 1375° F., at about 18° F./hour.
Heated from 1375° F., to 1450° F., at about 35° F./hour and held at 1450° F., for 1.5 hours.
Cooled to room temperature at the rate of about 300° F. hour.

At the end of this period, the flesk was transparent and semicrystalline as determined by X-ray diffraction techniques. The major crystalline phase present was beta-eucryptite or beta-eucryptite like crystals as determined by the X-ray diffraction. The coefficient of expansion was in the range of about $-4$ to about $+4\times10^{-7}/°$ C. (0–300° C.).

The flask was then placed in a furnace preheated at 1800° F., where a stream of air at room temperature was directed onto the side of the flask. The air flow rate was about 50 c.f.h. through a ¼ inch O.D. stainless steel tube passing through the furnace wall, with the end positioned about ½ inch from the flask. The temperature of the furance was then raised to 1950° F. and maintained for 1¼ hours while the cooling air stream was continued. The furnace was then turned off and the flask was allowed to cool slowly to room temperature with the cooling air being continued until the flask temperature was about 1400° F. (about 1 hour).

The flask was observed to be uniformly opaque except for the circular area of about 1 inch diameter that was cooled by the air stream. The coefficient of thermal expansion of the opaque area was observed to be in the range of about 6 to about $12 \times 10^{-7}/°$ C. (0–300° C.). The stress at the cross section of the interface of the transparent and opaque areas was measured by standard optical techniques utilizing polarized light. The stress was observed to be about 400–500 p.s.i. compression at the surfaces and about 500–600 p.s.i. tension in the central region of the cross section. The flask thickness varied from about 0.05 to about 0.22 inch.

In order to demonstrate the strength characteristics of such selectively opaque flasks, a thermal shock testing procedure was utilized. The flasks were preconditioned by uniformly abrading the outside surface with 150 grit emery cloth. The emery cloth was manually rubbed against the surface using a swirling motion under about 2 pounds pressure. This preconditioning assures that the surface defects will be approximately the same in all flasks tested.

Following the above conditioning, the samples were maintained at the test temperature for about ½ hour, then immediately plunged to ¾ of their height into tap water at room temperature. Care was taken not to allow water to contact the inside surfaces. Thermal shock testing was started at 100° C. differential and was conducted until there were no survivors. All six of the samples tested failed at 700° C. or 800° C. temperature differentials.

In order to establish an experimental control, several flasks of the same composition and geometric configuration were subjected to identical abrasion and heat treatments except that the cooling air treatment was deleted. The resulting heat treated flasks were therefore uniformly opaque.

Six of these uniformly opaque flasks were preconditioned and subjected to the thermal shock treatment described above. All six of the flasks failed at either the 700° C. or 800° C. differential.

The above results demonstrate that the heat treatment to produce selectively opaque bodies has no detrimental effect on strength as reflected in resistance to thermal shock.

EXAMPLE II

Rod samples of about ¼ inch in diameter of the composition of Example I were wrapped with a Nichrome heating element in the form of a spiral and placed in an electric laboratory furnace.

The rods were heated at a temperature of about 1300° F. for about 4 hours to effectuate nucleation. The furnace temperature was then raised to about 1450° F. to effectuate crystalline growth, and maintained at this level for about 2 hours to produce a transparent, semicrystalline ceramic body. At the beginning of the 2 hour period, electrical current was passed through the Nichrome heating element so as to raise the temperature of the rod in the immediate vicinity to about 1900° F. At the end of the 2 hour period there was an attractive opaque spiral decoration on the transparent semicrystalline ceramic rod sample where the Nichrome heating element had been in contact. In addition, there was no decrease in resistance to thermal shock. The selectively opaque rod had properties similar to the selectively opaque flasks of Example I.

While the invention has been described with reference to certain preferred embodiments thereof, it will be appreciated by those skilled in the art that various changes or modifications can be made in the process described without departing from the spirit of the invention.

We claim:
1. A method of making a partially crystalline glass ceramic article having transparent and opaque areas which comprises, making a thermally crystallizable lithium aluminosilicate glass melt, forming a glass article from said glass melt, subjecting the glass article to a nucleating temperature range of from 30° F. below the annealing point to 250° F. above the annealing point of said glass for a period of time sufficient to form a multiplicity of nuclei therein and thereafter subjecting said nucleated glass to a crystallization temperature range for a period of time sufficient to thermally, in situ, crystallize said article to a transparent, crystallized glass-ceramic having as the predominant crystalline species beta-eucryptite, said glass-ceramic having an average lineal coefficient of thermal expansion of no more than 60% of the expansion of the starting material glass and no more than $12 \times 10^{-7}/°$ C. (0–300° C.), and selectively subjecting predetermined areas of said transparent glass-ceramic to a crystallization temperature range for a time sufficient to thermally, in situ, crystallize said predetermined areas to an opaque semicrystalline glass-ceramic wherein the resulting opaque semicrystalline glass-ceramic areas contain as the predominant crystalline species beta-spodumene, the opaque semicrystalline glass-ceramic areas of said article having an average coefficient of thermal expansion of less than $20 \times 10^{-7}/°$ C. (0–300° C.).

2. A method of claim 1, wherein said lithium aluminosilicate glass contains the following components in the following weight percent ranges:

| | Percent |
|---|---|
| $SiO_2$ | 50–75 |
| $Al_2O_3$ | 16–35 |
| $Li_2O$ | 2.5–6 | and an effective amount of nucleating agent.

3. A method of claim 2, wherein said glass contains at least one of the following nucleants in the range indicated:

| | Percent |
|---|---|
| $TiO_2$ | 0–6 |
| $ZrO_2$ | 0–12 |
| $SnO_2$ | 0–12 |
| $(TiO_2+ZrO_2+SnO_2)$ | 1.5–12 |

4. A method of claim 3, wherein said lithium aluminosilicate glass contains the following components in the following weight percent ranges:

| | Percent |
|---|---|
| $SiO_2$ | 55–72 |
| $Al_2O_3$ | 16–27 |
| $Li_2O$ | 3–5 | and an effective amount of a nucleating agent.

5. A method of claim 4, wherein said lithium aluminosilicate glass contains at least one of the following modifying agents in the weight percentage, 0–2% $K_2O+Na_2O$, 0–5% $CaO+MgO+BaO$, 0–3% $P_2O_5$, 0–5% $ZnO$, 0–0.2% $F_2$.

6. An article of manufacture comprising a semicrystalline ceramic body formed by in situ thermal crystallization of a crystallizable lithium aluminosilicate glass, said semicrystalline ceramic body possessed of predetermined transparent and opaque areas arranged in a manner such as to impart a decorative or informational effect to the article, said article containing as the predominant crystalline species lithium containing crystalline phases selected from the group consisting of beta-eucryptite, beta-spodumene and mixtures thereof, said crystalline species being dispersed in a glassy matrix as a result of in situ thermal crystallization, said transparent crystallized glass-ceramic areas having as the predominant crystalline species beta-eucryptite, said transparent areas having an average coefficient of thermal expansion of no more than 60% of the expansion of the starting material glass and no more than $12 \times 10^{-7}/°$ C. (0–300° C.) and said opaque areas having as the predominant crystalline species beta-spodumene, said opaque areas having an average coefficient of thermal expansion of less than $20 \times 10^{-7}/°$ C. (0–300° C.) and having been formed by further in situ thermal crystallization of selected areas of said transparent crystallized glass ceramic.

7. An article of claim 6, wherein said lithium alumino-silicate glass contains the following components in the following weight percent ranges:

|  | Percent |
|---|---|
| $SiO_2$ | 50–75 |
| $Al_2O_3$ | 16–35 |
| $Li_2O$ | 2.5–6 | and an effective amount of nucleating agent.

8. An article of claim 7, wherein said glass contains at least one of the following nucleants in the range indicated:

|  | Percent |
|---|---|
| $TiO_2$ | 0–6 |
| $ZrO_2$ | 0–12 |
| $SnO_2$ | 0–12 |
| $(TiO_2+ZrO_2+SnO_2)$ | 1.5–12 |

9. An article of claim 8, wherein said lithium aluminosilicate glass contains the following components in the following weight percent ranges:

|  | Percent |
|---|---|
| $SiO_2$ | 55–72 |
| $Al_2O_3$ | 16–27 |
| $Li_2O$ | 3–5 | and contains an effective amount of at least one of the following modifying agents in the weight percentage: 0–2% $K_2O+Na_2O$, 0–5% $CaO+MgO+BaO$, 0–3% $P_2O_5$, 0–5% ZnO and 0–0.2% $F_2$.

10. A method of making a semicrystalline glass-ceramic article consisting of transparent and opaque portions arranged in such a way as to provide decorative or informational effects thereon, said method comprising:
  (1) making a thermally crystallizable lithium alumino-silicate glass melt,
  (2) forming a glass article from said melt,
  (3) subjecting said glass article to a nucleation temperature range for a period of time sufficient to form a multiplicity of nuclei therein and thereafter
  (4) subjecting said nucleated glass to a crystallization temperature range for a time sufficient to thermally, in situ, crystallize said article to a transparent, crystallized glass-ceramic having as the predominant crystalline species beta-eucryptite,
    (a) said transparent, crystallized glass-ceramic having an average lineal coefficient of thermal expansion of no more than 60% of the expansion of the thermally crystallizable glass from which it was made,
  (5) and selectively subjecting predetermined areas of said transparent, crystallized glass-ceramic to a crystallization temperature range for a period of time sufficient to thermally, in situ, crystallize said predetermined areas to an opaque semicrystalline glass-ceramic wherein the resulting opaque semicrystalline glass-ceramic portions of said article contain as the predominant crystalline species beta-spodumene.

11. The method as defined in claim 10 wherein said predetermined areas of said transparent crystallized glass-ceramic are in contact with a heating element having the configuration of said predetermined areas, raising the temperature of said heating element to within a range sufficient to convert the transparent glass-ceramic in contact therewith to an opaque glass-ceramic and maintaining said heating element at said temperature for a period of time sufficient to render said contacting glass-ceramic opaque.

12. A method of making a semicrystalline glass-ceramic article consisting of transparent and opaque portions arranged in such a way as to provide decorative or informational effects thereon, said method comprising:
  (1) making a thermally crystallizable lithium alumino-silicate glass melt,
  (2) forming a glass article from said melt,
  (3) subjecting said glass article ot a nucleation temperature range for a period of time sufficient to form a multiplicity of nuclei therein and thereafter
  (4) subjecting said nucleated glass to a crystallization temperature range for a time sufficient to thermally, in situ, crystallize said article to a transparent, crystallized glass-ceramic having as the predominant crystalline species beta-eucryptite,
    (a) said transparent, crystallized glass-ceramic having an average lineal coefficient of thermal expansion of no more than 60% of the expansion of the thermally crystallizable glass from which it was made,
  (5) and subjecting said transparent, crystallized glass-ceramic article to a crystallization temperature range for a period of time sufficient to thermally, in situ, crystallize said glass-ceramic to an opaque semicrystalline glass-ceramic having as the predominant crystalline species beta-spodumene,
  (6) while simultaneously maintaining a pre-selected portion of said transparent, crystallized glass-ceramic article at a temperature below said crystallization temperture range, said preselected portion of said crystallized glass-ceramic article remaining transparent while the remainder of said article is rendered opaque.

13. The method as defined in claim 12 wherein said preselected portion of said transparent, crystallized glass-ceramic article is maintained at a temperature below said crystallization temperature range by passing a stream of air onto said preselected areas during the time said article is at the crystallization temperature range in which the remainder of the article becomes opaque.

References Cited
UNITED STATES PATENTS

| 3,157,522 | 11/1964 | Stookey | 106—39 |
| 3,282,712 | 11/1966 | Tashiro et al. | 106—39 |
| 3,295,944 | 1/1967 | Baak | 65—33 |
| 3,298,553 | 1/1967 | Lusher | 65—33 |
| 3,380,818 | 4/1968 | Smith | 65—33 |

FOREIGN PATENTS

| 1,300,614 | 6/1962 | France. |

HELEN M. McCARTHY, Primary Examiner

U.S. Cl. X.R.
65—33; 106—52